United States Patent [19]

Tsutsumi et al.

[11] Patent Number: 4,719,157
[45] Date of Patent: Jan. 12, 1988

[54] FUEL CELL STACK ASSEMBLY

[75] Inventors: Masaru Tsutsumi, Hyogo; Hideo Hagino, Otsu; Osamu Fujiwara, Kobe; Hitoshi Goto, Hirakata, all of Japan

[73] Assignee: Sanyo Electric Co., Ltd., Osaka, Japan

[21] Appl. No.: 871,335

[22] Filed: Jun. 6, 1986

[30] Foreign Application Priority Data

Jun. 7, 1985 [JP] Japan .................. 60-124751
Feb. 7, 1986 [JP] Japan .................. 61-26102

[51] Int. Cl.⁴ .................. H01M 2/30; H01M 8/02
[52] U.S. Cl. .................. 429/34; 429/12; 429/66
[58] Field of Search .......... 429/12, 34, 66, 152, 429/153, 154, 155, 178, 179, 180, 181, 182, 183, 184

[56] References Cited

U.S. PATENT DOCUMENTS 759,007  5/1904  Nibblett .................. 429/66
2,812,378 11/1957 Barrett .................. 429/178

FOREIGN PATENT DOCUMENTS 0891190 3/1962 United Kingdom .................. 429/153

Primary Examiner—John F. Niebling
Assistant Examiner—Steven P. Marquis
Attorney, Agent, or Firm—Armstrong, Nikaido, Marmelstein & Kubovcik

[57] ABSTRACT

A current collecting equipment for a fuel cell assembly of the kind wherein a current collector, a heat resisting insulator and an end plate are in turn being mounted on each end of a fuel cell stack is characterized in that the current collector comprises a plurality of current collecting sections arranged with spaces between sides of the adjacent sections, and that terminals are respectively connected to the current collecting sections and brought out through the end plate. The current collecting equipment may comprises four current collecting sections, a conductor frame provided with four through holes at its corners and four inner terminals being connected to each section and connected to the conductor frame, and an output terminal mounted on the frame and brought out through the end plate.

6 Claims, 11 Drawing Figures

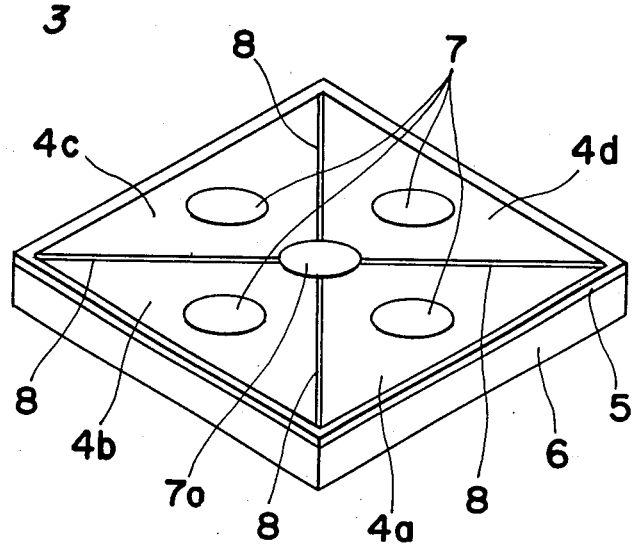
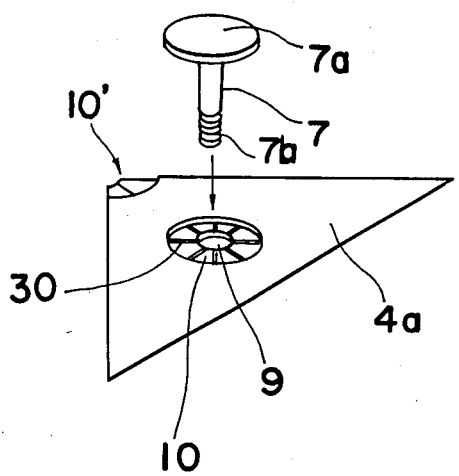
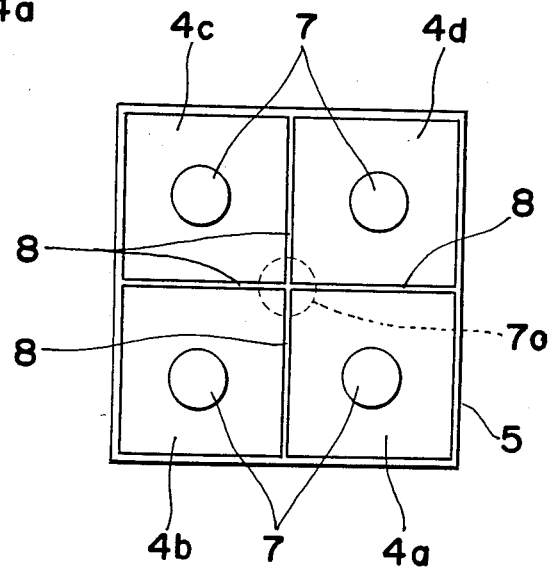

FUEL CELL STACK ASSEMBLY

FIELD OF THE INVENTION

This invention relates to a fuel cell assembly and, more particularly, to a current collecting equipment for a fuel cell assembly with a large electrode area.

BACKGROUND OF THE INVENTION

In a fuel cell assembly of the kind wherein a current collector, a heat resisting insulator and an end plate are in turn arranged on each end of a fuel cell stack, the current collector is connected to a terminal brought out through the end plates.

Such a current collector construction is sufficient for a fuel cell assembly with an electrode area of 1000 $cm^2$ or less. However, if such a construction is applied to a fuel cell assembly with an electrode area of 2000 to 3000 $cm^2$, the current collecting efficiency becomes lowered, and deviation of output power occurs. It is therefore required to increase the number of terminals from one to two, three, four, five and so on with increase in the electrode area, for example, as shown in FIG. 8. A current collecting equipment of FIG. 8 has five terminals 7, which are connected to a current collector 4 and brought out through an insulator 5 and an end plate 6.

When the current collector 4 expands with heat during operation of the fuel cell assembly, the terminals 7 prevent the current collector 4 from free expansion, resulting in undulating deformation of the collector. This causes failure in electrical contact between the current collector and the electrode, resulting in a lowering of the current collecting efficiency and thus deterioration of the fuel cell characteristics.

SUMMARY OF THE INVENTION

It is therefore an object of the present invention to provide a current collecting equipment for a fuel cell assembly that has a high current collecting efficiency even if it is applied to a fuel cell assembly with a large electrode area.

Another object of the present invention is to provide a current collecting equipment for a fuel cell assembly that makes it possible to prevent a current collector from deformation due to expansion with heat.

Still another object of the present invention is to provide a current collecting equipment for a fuel cell assembly that make wiring operation easy.

According to the present invention there is provided a current collecting equipment for a fuel cell assembly of the kind wherein a current collector, heat resisting insulator and an end plate are being stacked in turn on each end of a fuel cell stack, characterized in that the current collector comprises a plurality of current collecting sections arranged with spaces between sides of adjacent sections, and that a plurality of terminals are respectively connected to the current collecting sections and brought out through the end plate.

In a preferred embodiment, the current collector comprises four triangular current collecting sections which are so arranged that the spaces between sides of adjacent two sections extend radially from the center of the current collector along the diagonal lines of the current collector.

In another embodiment, the current collector comprises four rectangular current collecting sections which are so arranged that the spaces between sides of adjacent two sections extend radially from the center of the current collector along the lines perpendicular to the sides of the current collector.

These current collecting sections may be prepared by dividing a rectangular thin plate into four along its diagonal lines or lines perpendicular to the side of the plate.

In the current collecting equipment of the present invention, the current collector comprises plural current collecting sections arranged with spaces and the terminals are respectively planted in the current collecting sections and brought out through the insulating plate and the end plates. Thus, each current collecting sections can freely expand and contract with changes of temperature because of the presence of spaces left between sides of the adjacent sections, thus making it possible to avoid the deformation of the current collecting sections and thus a lowering of the collecting efficiency.

According to the present invention, there is further provided a current collecting equipment for a fuel cell assembly of the kind, characterized in that the current collector comprises a plurality of current collecting sections arranged with spaces between sides of the adjacent sections, and that inner terminals are respectively connected to the current collecting sections and connected one another by means of a conductor frame, the conductor frame being arranged between the insulator and the end plate and connected to an output terminal brought out through the end plate.

BRIEF DESCRIPTION OF THE DRAWINGS

FIG. 3 is a perspective view of a current collecting equipment utilized in the fuel cell assembly of FIG. 1 and illustrating an inner side of the equipment;

FIG. 4 is an exploded perspective view of current collecting section and an output terminal utilized in the equipment of FIG. 3;

FIG. 5 is a bottom plan view of another form of a current collecting equipment embodying the present invention;

DESCRIPTION OF THE PREFERRED EMBODIMENTS

Figure 1:
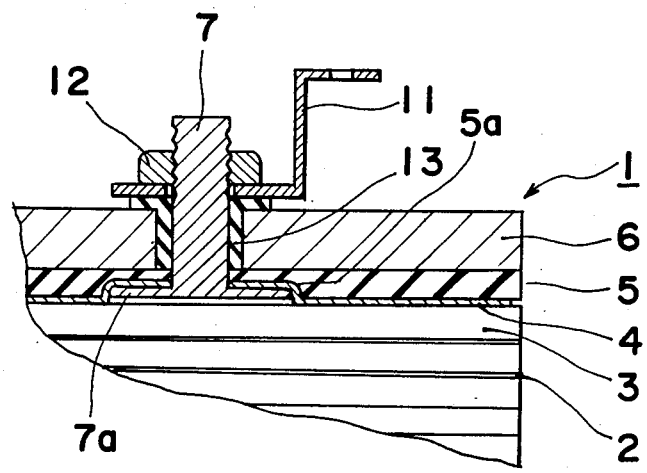
FIG. 1 is a fragmentary section view of a fuel cell assembly embodying the present invention.
Figure 2:
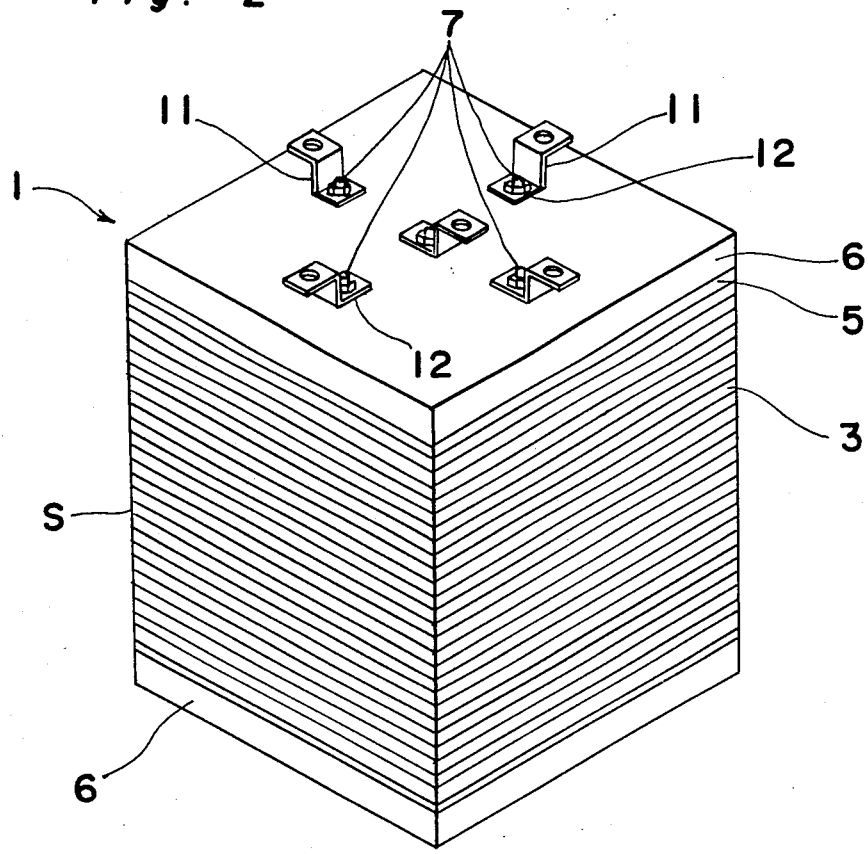
FIG. 2 is a perspective view of a fuel cell assembly embodying the present invention.

Referring now to FIGS. 1 to 4, particularly, FIG. 2, there is shown a fuel cell assembly 1 with a current collecting equipment according to the present invention. The assembly 1 comprises a fuel cell stack (S), a pair of current collector 4, a pair of heat resisting insulator 5, and an end plate 6. The fuel cell stack (S) comprises a plurality of individual fuel cells and graphite gas separator, or, bipolar plates 3, which are alternately stacked and tightened together with the end plates 6 by clamping means (not shown).

Each current collector 4 is composed of four triangular current collecting sections 4a, 4b, 4c and 4d, which are so arranged that one side of each section is parallel to the side of the heat resisting insulator 5 and that narrow spaces 8 are left between each of the remaining sides of the section and that of the adjacent section. The spaces 8 have a length of 1 to 2 mm and extend radially from the center of the current collector 4 to its sides along diagonal lines of the insulator 5.

As shown in FIG. 4 the current collecting sections 4a, 4b, 4c and 4d are respectively provided with a terminal seat 10 at its central portion and a quarter terminal seat 10' at its one vertex. The terminal seat 10 and quarter terminal seat 10' are formed by raised ribs 30 and has an opening 9 at its center portion. Such current collecting sections 4a, 4b, 4c and 4d may be prepared by first embossing and punching a rectangular plate and then cutting the same into four along its diagonal lines to form four triangular current collecting sections.

The heads $7a$ of the terminals 7 are seated in the terminal seat 10, 10' and their threaded shanks $7b$ are projected over the end plate 6 through flanged insulating sleeves 13 mounted in through holes of the end plate 6. A terminal $7_0$ is arranged as a common terminal in the terminal seat 10' formed at the vertexes of the four section plates. The raised terminal seats 10 of the sections 4a, 4b, 4c and 4d are respectively rested in recesses 5a formed in the insulating plate 5, as shown in FIG. 1.

The current collecting equipment having the above construction may be assembled by first placing the heat resisting insulator 5 and current collecting sections 4a, 4b, 4c and 4d in turn on the end plate 6, inserting shanks of the terminals 7 and $7_0$ into the openings 9 and insulating sleeves 13, and then fixing them with nuts 12. Arranged between a flange of each insulating sleeve 13 and the nut 12 is a terminal lug 11 to be connected to a wire. The terminal lug 11 is being insulated from the end plate 6 by the flanged insulating sleeve 13.

FIG. 5 shows another form of a current collecting equipment for a fuel cell assembly embodying the present invention. The current collecting equipment of this embodiment has the same construction as that of the embodiment of FIG. 3 except for that the current collector 4 comprises four rectangular current collecting sections 4a, 4b, 4c and 4d. The current collecting sections 4a, 4b, 4c and 4d are so arranged that two sides of each section are parallel to adjacent sides of the heat resisting insulator 5 and that the remaining two sides of the adjacent sections form narrow spaces 8 together with the sides of the adjacent section. The spaces 8 extend from the center of the insulator 5 to its sides along the lines parallel to the sides of the insulator 5.

As can be seen from the above, the current collector of the present invention is divided into smaller sections corresponding to the number of terminals, making expansion of the individual sections small. In addition, the current collecting sections are arranged with spaces between them and respectively connected to the corresponding terminals. Accordingly the sections are prevented from deformation even if the individual sections expand with heat during operation of the fuel cell assembly, which in turn makes it possible to keep the current collecting efficiency constant for a long period.

The present invention is particularly useful for a fuel cell assembly with a larger area of the electrodes.

Figure 6:
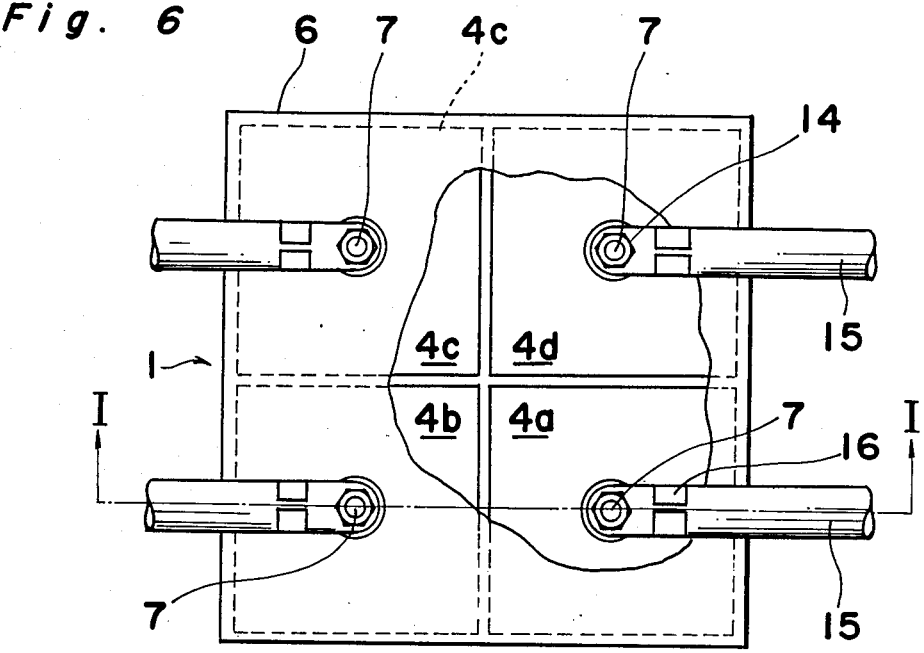
FIG. 6 is a partially cutaway top plan view of another form of a current collecting equipment embodying the present invention.
Figure 7:
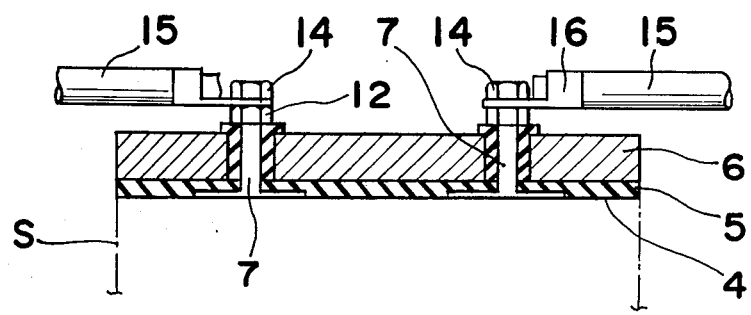
FIG. 7 is a section view taken on line I—I of FIG. 6.
Figure 8:
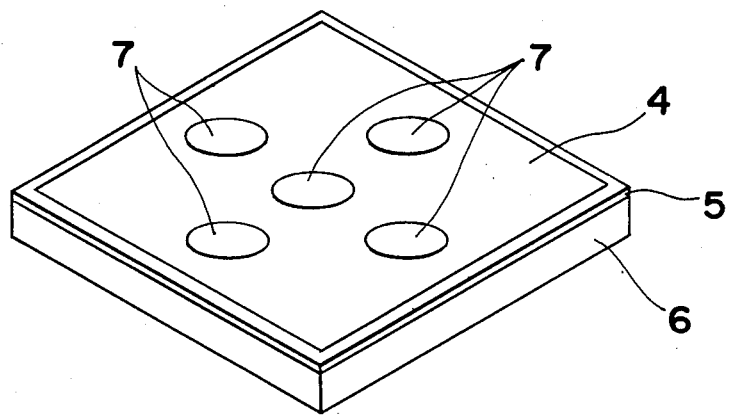
FIG. 8 is a perspective view of a current collecting equipment utilized in a fuel cell assembly of the prior art and illustrating an inner side of the equipment.

In the foregoing embodiments, the terminals are being brought out through the insulating sleeves 13 mounted in the top and bottom end plates, so that it is required to connect all the terminals 7 and $7_0$ with wires 15 and lugs 16 to collect all the current from them, as shown in FIGS. 6 and 7. However, such external wirings are low in operation efficiency and causes failure in insulation and connection between components of the fuel cell assembly. In addition, such wirings make external appearance of the fuel cell assembly poor.

These disadvantages may be solved by connecting the terminals 7 one another in the inside of the fuel cell assembly and providing one terminal on each end plate.

Figure 9:
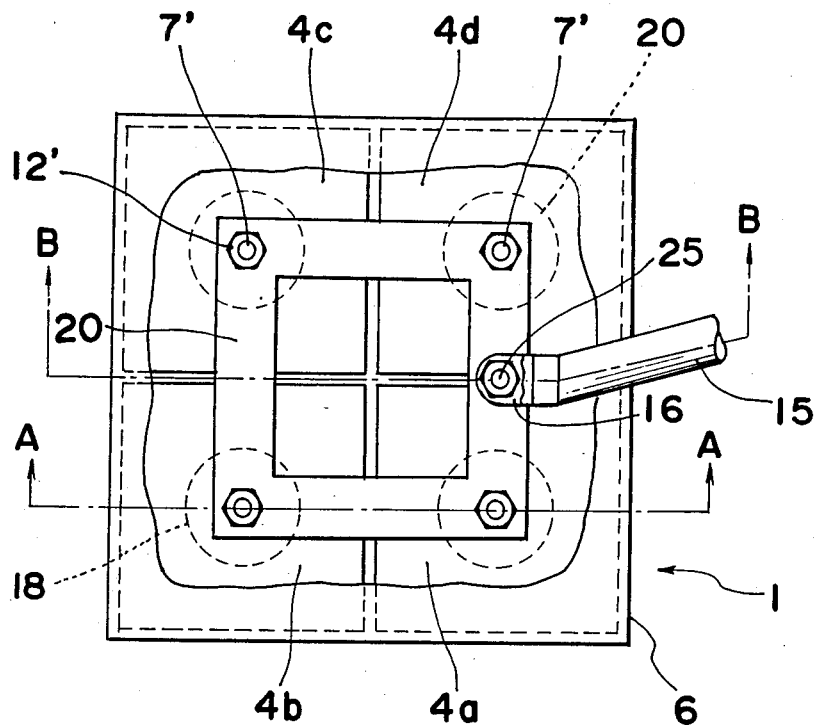
FIG. 9 is a partially cutaway top plan view of another form of a fuel cell assembly embodying the present invention.
Figure 10:
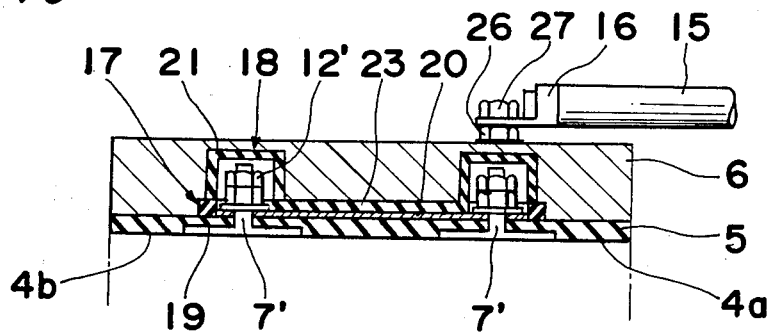
FIG. 10 is a section view taken on line A—A of FIG. 9.
Figure 11:
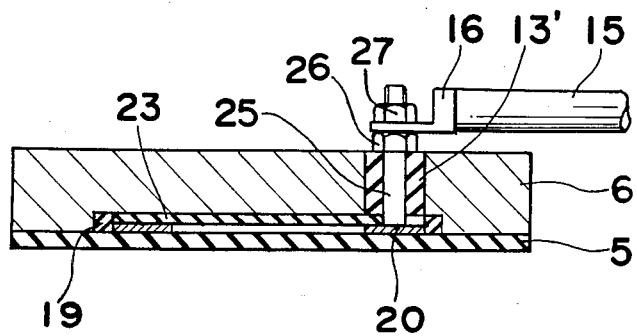
FIG. 11 is a section view taken on line B—B of FIG. 9.

Referring now to FIGS. 9 to 11, there is shown another form of a fuel cell assembly 1 with a current collecting equipment according to the present invention. The assembly comprises a fuel cell stack (S), a pair of current collectors 4, heat resisting insulators 5 and a pair of end plates 6 which are tightly fastened by clamping means (not shown).

In this embodiment, the current collecting equipment comprises four current collecting sections 4a, 4b, 4c and 4d, four threaded inner terminals 7', a conductor frame 20 made of copper and provided with four through holes at its corners, and an output terminal 25. The current collecting sections 4a, 4b, 4c and 4d have a construction similar to that of FIG. 5. The sections and conductor frame 20 are fixed to the heat resisting insulator 5 by arranging them on the insulator 5, inserting the inner terminals 7' into the through holes of the conductor frame 20 through the openings 9 of the sections and through holes of the insulator 5, and then tightening nuts 12'. The terminals 7' are electrically connected by the conductor frame 20.

Each end plate 6 is provided with a groove 17 corresponding to the shape of the conductor frame 20 to house the same. At the corners of the groove 17, there are four cylindrical recess 18 to house the projecting ends of the inner terminals 7' and insulate the same from the end plate 6. Arranged in the groove 17 are an insulating frame 19 and insulating strips 23 to insulate the conductor frame 20 from the end plate 6. The cylindrical recesses 18 are provided with insulating coatings 21 to insulate the projecting ends of the inner terminals 7' from the end plate 6. The insulating coatings 21 are not necessarily required and may be replaced with air spacing.

A threaded output terminal 25 is welded to the conductor frame 20 and fixed to the end plate 6 by inserting its shank into an insulating sleeve 13' mounted in the end plate 6, and then tightening its projecting end with a nut 26. The output terminal 25 is insulated from the end plate 6 by means of the sleeve 13 and electrically connected to a wire 15 by means of a nut 27.

In this embodiment, the individual inner terminals are connected one another by the conductor frame 20 arranged in the fuel cell assembly 1, and a single output terminal 25 connected to the conductor frame 20 is brought out through the end plate 6 of the assembly 1. Thus, it is possible to avoid open wirings, which in turn makes it possible to simplify the terminal connection and improve the current collecting efficiency. In addition, failure in insulation and connection can be prevented.

It is clear that the invention may be embodied in other forms without departing from the spilit thereof.

For example, the current collector may be devided into several sections, and the numbers of current collecting sections and terminals may vary according to demand.

What I claim is:

1. A fuel cell stack assembly comprising a fuel cell stack, thin current collectors arranged on opposite ends of the fuel cell stack, and end plates arranged on the current collectors, said end plates being insulated from the current collector by a heat resisting insulator arranged therebetween, each of said current collectors comprising a plurality of independent current collecting sections, said current collecting sections on each end of the fuel cell stack being spaced from each other and each provided with a single terminal extending therefrom through said insulator and end plate.

2. The fuel cell stack assembly according to claim 1 wherein the current collector comprises four triangular sections being so arranged that the spaces formed between sides of the adjacent two sections extend radially from the center of the collector along the diagonal lines of the current collector.

3. The fuel stack assembly according to claim 1 wherein the current collector comprises four rectangular sections being so arranged that the spaces between adjacent sides of two sections extend radially from the center of the collector along the lines perpendicular to the sides of the collector.

4. The fuel cell stack assembly according to claim 2 or claim 3 wherein a common terminal is arranged on the center of the collector and brought out through the end plate.

5. A fuel cell stack assembly comprising a fuel cell stack, a pair of thin current collectors arranged on opposite ends of the fuel cell stack, and end plates arranged on the current collectors, each of said end plates being insulated from the current collector by a heat resisting insulator arranged therebetween, each of said current collectors comprising a plurality of independent current collecting sections, said current collecting sections for each current collector being spaced from each other and each provided with a single inner terminal extending therefrom through said insulator, said inner terminals being connected one another by a conducting frame arranged between said insulator and end plate, said conducting frame being insulated from said end plate and provided with at least one output terminal extending through the end plate.

6. The fuel cell stack assembly according to claim 5, wherein said conducting frame is insulated from the end plate by an insulating frame and insulating strips, said inner terminals being projected in recesses of the end plate and insulated therefrom.

* * * * *